E. H. WAUGH.
SCRAPER FOR FISH DRESSING MACHINES.
APPLICATION FILED MAR. 3, 1920.
1,384,877.
Patented July 19, 1921.
2 SHEETS—SHEET 1.
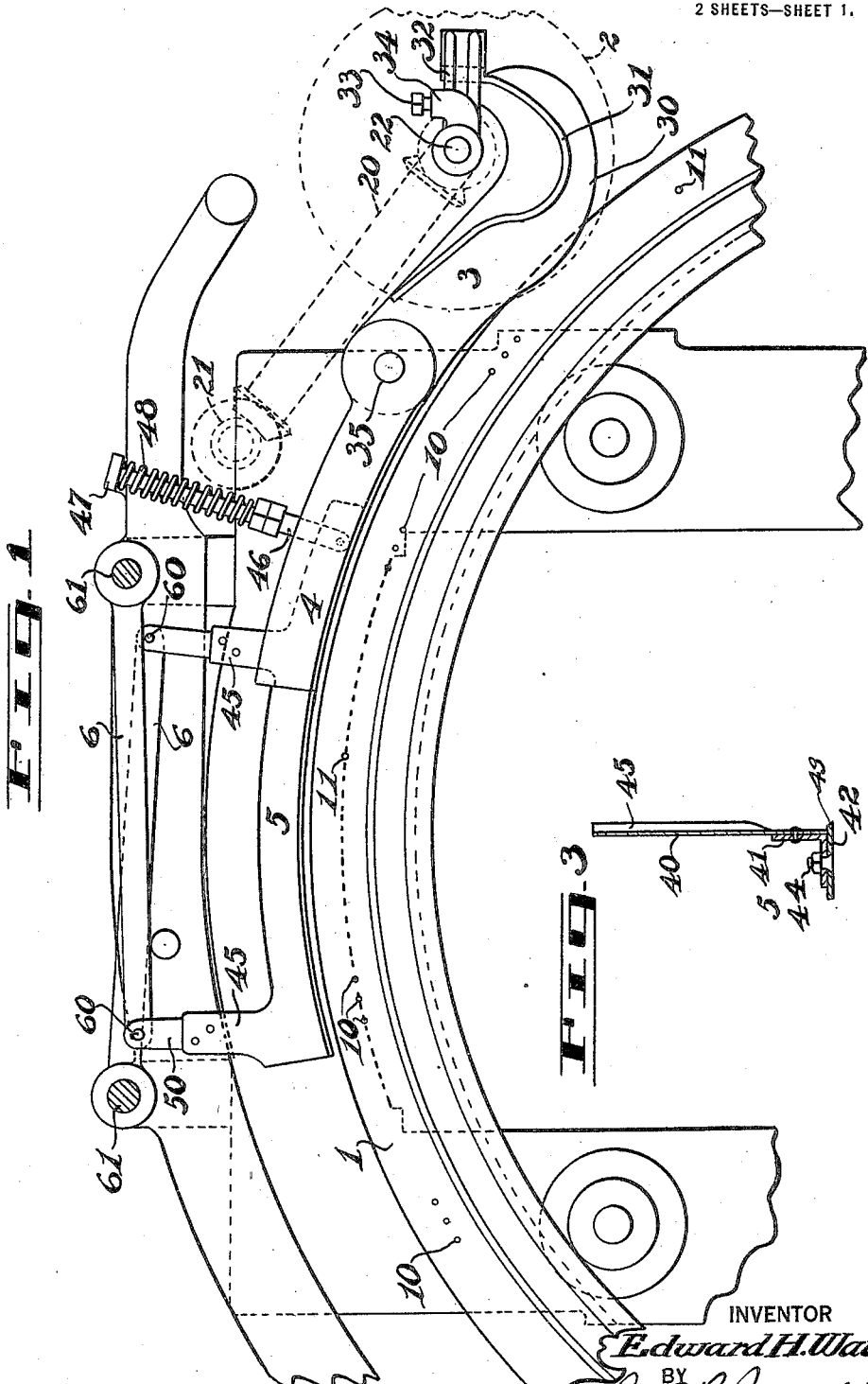
INVENTOR
Edward H. Waugh
BY
F. L. & C. L. Reynolds.
ATTORNEY

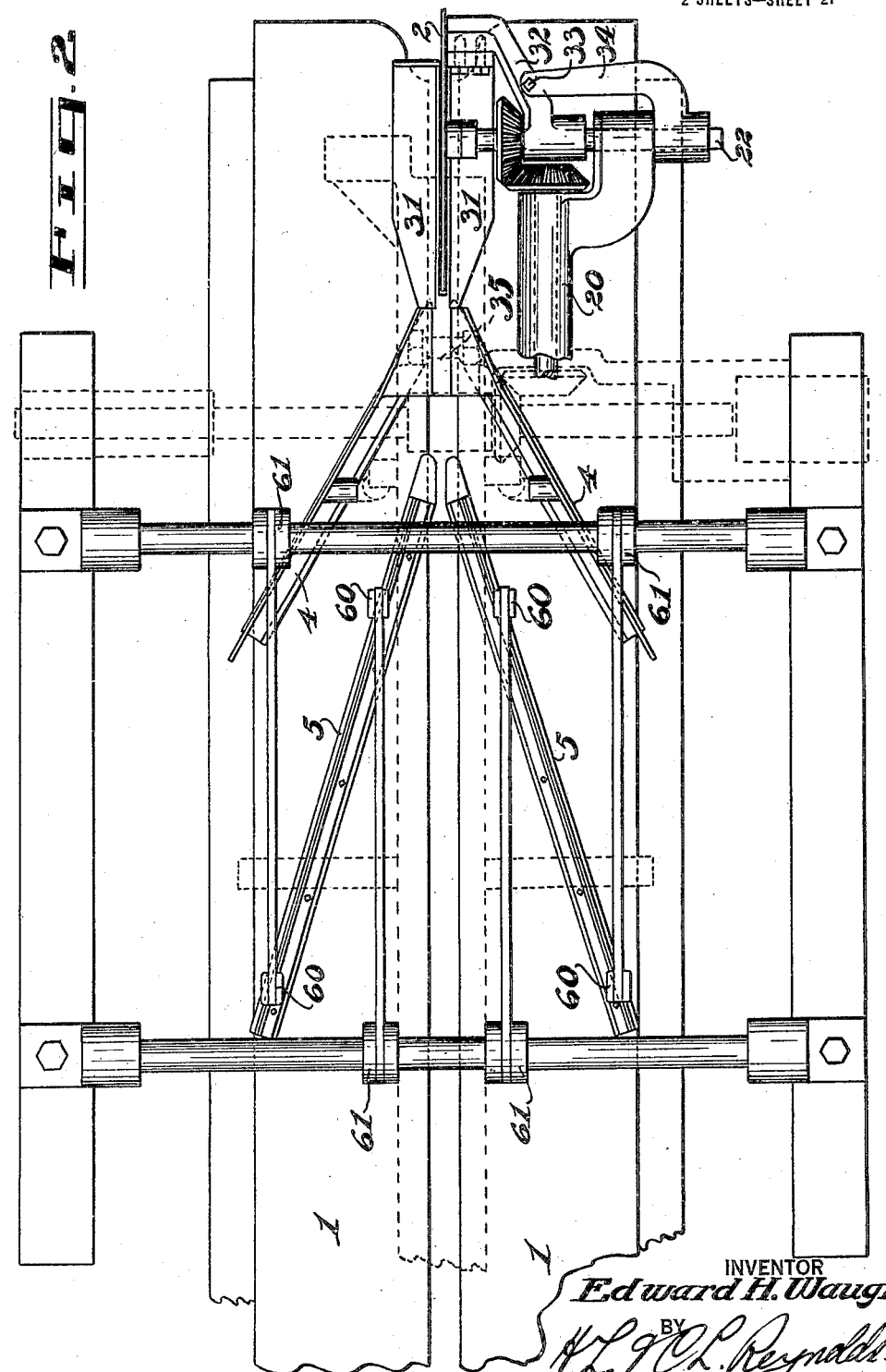

UNITED STATES PATENT OFFICE.

EDWARD H. WAUGH, OF SEATTLE, WASHINGTON, ASSIGNOR TO SMITH CANNERY MACHINES COMPANY, OF SEATTLE, WASHINGTON, A CORPORATION OF WASHINGTON.

SCRAPER FOR FISH-DRESSING MACHINES.

1,384,877.     Specification of Letters Patent.     Patented July 19, 1921.

Application filed March 3, 1920. Serial No. 362,998.

*To all whom it may concern:*

Be it known that I, EDWARD H. WAUGH, a citizen of the United States of America, and resident of the city of Seattle, in the county of King and State of Washington, have invented certain new and useful Improvements in Scrapers for Fish-Dressing Machines, of which the following is a specification.

My invention relates to fish dressing machines and consists of an improved scraping mechanism for cleaning the inner surface of the fish after it has been cut open.

The object of my invention is to provide a device of simple construction which may be employed for the purpose stated and which will do a superior character of work.

The features which I believe to be new and upon which I wish to secure a patent will be hereinafter described and then particularly pointed out in the claims.

In the accompanying drawings I have shown my invention embodied in the type of construction which I believe to be best adapted for use upon a fish dressing machine of a particular type.

In the drawings Figure 1 is a side elevation of a portion of such a fish dressing machine which includes the scrapers.

Fig. 2 is a plan view of the same parts.

Fig. 3 is a cross section through one of the scrapers, showing a typical character of construction.

The particular machine upon which this is shown is of that type shown in the patents to Smith, No. 998,129, and also the same as shown in my previous application, Serial No. 336,819.

In the drawings 1 represents one of the pair of bull rings which together constitute the carrier. The fish are secured upon the periphery of these rings and between them through the medium of pins or needles, as 10 and 11. The scraping mechanism herein illustrated is intended to act upon the fish immediately after it has been slitted. The location of the slitter saw is shown by the dotted circle 2. Such a saw is mounted in a frame 20 which is pivoted at the point 21 so that it may swing toward and from the carrier rings 1.

Pivotally supported upon the axis 22, upon which the slitter saw turns, is the separator 3. This separator is made in two parts, located at opposite sides of the saw and being duplicates of each other. Each part consists of a vertical web or blade 30 and a flange 31 which projects outwardly therefrom and which serves as a presser or guard to engage the surface of the fish in passing and prevent the saw from cutting too deeply.

The separator has an arm 32 extending forwardly of its pivot axis and this is engaged by a stop pin or bolt 33, which passes through an arm 34 carried by the frame 20 to thereby limit the angular swing of the separator in one direction.

Pivotally secured by the point 35 at the rear end of the separator are two scrape blades 4. These blades are positioned in tangential relation to each other so as to together form a V, the angle of which is at its forward or pivoted end. The typical shape of the scraping bars and of the other scraper 5, which is located rearwardly therefrom is shown in Fig. 3. This has a vertically positioned web or bar 40 which has secured to the back or inner side thereof an angular bar, or brackets, 41, as desired, to the horizontal web of which is secured the scraping blade 42. This scraping blade is made of a thin blade of steel and has the edge 43 which is beveled, with the forward bevel at the side which is out of the contact with the fish, said edge projecting slightly beyond the face of the blade 40. The manner of securing this blade to the brackets or angle bar 41, may be such as to provide an adjustment of the blade so as to project the scraping edge 43 more or less and also to adjust said blade as it wears down. This may be done by the use of bolts 44 and the provision of slots in one or the other of the members which are secured together thereby.

The bar 40 has arms 45 which extend upward and which are preferably given a slight angular twist. The forward set of scrapers 4 have secured thereto a rod 46 which extends upward to and through a lug, as 47, carried by a member of the frame. A spring, as 48, surrounding this bar, serves to hold this scraper down in a yielding manner and permit it to rise as may be necessary to permit passage of the fish. In this manner the scraper may be tipped and moved up and down as may be necessary to secure thorough and yet yielding contact with the inner surface of the fish.

The scrapers 5, which are located just to the rear of the scrapers 4, are in construction very similar to the scrapers 4. The typical cross section shown in Fig. 3 illustrates the type of construction which is preferred for these scrapers. The arms 45 extending upward have extensions 50 to which are secured the supporting and controlling links 6. These links extend in directions substantially parallel with the carrier in its adjacent portion; or more correctly, they are substantially-parallel to the tangent to the circular carrier illustrated at the adjacent point. One end is pivoted, as at 60, to an arm 50 of the scraper. The other end is pivoted, as at 61, to a fixed pivot which is located adjacent to and outside of the opposite end of the scraper. The two links 6 extend in opposite directions and so as to extend over the scraper. In consequence of this method of supporting the scrapers, they are free to move up and down and to rock so as to fit all irregularities of the fish and all thicknesses. They are, in effect, in suspension, free to rock in any way desired and yield only against movement in the direction of the movement of the carrier.

Both the scrapers 4 and 5 are placed in diagonal relation to the path of the fish in passing. They are also curved on the side which engages with the fish in a manner conforming roughly to the cylindrical or circular character of the carrier. In consequence, they will closely fit the surface of the fish, notwithstanding the fact that the surface of the fish which is being scraped partakes of a cylindrical shape at the time. The broad bottom face formed by the under face of the plate 42 serves as a bearing upon the body of the fish to prevent the scraping edge from digging in and mutilating the fish. The slight projections of the scraping edge beyond the bar 40 or 5, as the case may be, also serves to prevent undue digging in of the scraper. I have found that scrapers of this character give a superior result in practical operation. They are also cheap to make and easy to maintain in good working condition.

What I claim as my invention is:

1. In a fish dressing machine, in combination, a carrier for the fish, a scraper having its scraping edge placed diagonally of the path of the carrier and supports for said scraper comprising arms pivoted toward the ends of the scraper and extending back toward the opposite ends of the scraper, and pivot supports for the other ends of said arms.

2. In a fish dressing machine, in combination, a carrier for the fish, a scraper, and supporting bars for said scraper extending approximately parallel with the direction of movement of the adjacent part of the carrier, one end of each bar being pivoted to its respective end of the scraper and its other end being pivotally supported adjacent to the pivot of the other bar.

3. In a fish dressing machine, in combination, a fish carrier, a scraper bar positioned diagonally of the direction of movement of the scraper, links pivoted by one end to end portions of the scraper and by their other end to a fixed support, said links extending substantially parallel with the direction of movement of the adjacent part of the carrier, and from their pivotal connection with the scraper back over the scraper.

4. In a fish dressing machine, in combination, a rotative circular carrier, a scraper extending diagonally of the carrier and curved to conform to the curvature of the carrier, and links pivoted to the ends of the carrier and to fixed supports and extending outside of and over the scraper.

5. In a fish dressing machine, in combination, a rotative circular carrier, a scraper extending diagonally of the carrier and curved to conform to the curvature of the carrier, and links pivoted to the ends of the carrier and to fixed supports and extending substantially parallel with a tangent to the adjacent part of the carrier, each from its connection with the scraper toward the like point of the other.

6. In a fish dressing machine, in combination, a separator adapted to enter a slitted fish and having a pivotal support for its front end adapted to be moved toward and from the fish, and a V-shaped scraper pivoted to the rear end of the separator and having scraping edges at its outer lower corners curved to conform approximately to the outer surface of a cylinder.

7. In a fish dressing machine, in combination, a slitter saw, a frame in which said saw is journaled, said frame being mounted for movement toward and from the fish, a separator pivoted upon said frame and having fish-entering blades alongside of the slitter saw, and adjustable stop members carried by said frame and separator and limiting the swing of the latter.

8. In a fish dressing machine, in combination, a slitter saw, a frame in which said saw is journaled, said frame being mounted for movement toward and from the fish, a separator pivoted upon said frame and having fish-entering blades alongside of the slitter saw, and presser flanges extending laterally from the separator blades and adapted to engage the outside of the fish, and adjustable stop members carried by said frame and separator and limiting the swing of the latter.

9. The combination with means for conveying a fish lengthwise through a circular path, of a scraper for the fish comprising a bar having a scraping edge curved to fit the surface of the fish when said edge is placed in diagonal position relative to the path of the fish.

10. A scraper for fish dressing machines comprising a bar having a scraping edge curved to fit the surface of a cylinder when said edge is placed in diagonal position relative to the cylinder, and means for yieldingly carrying said bar to move toward and from the cylinder.

11. A scraper for fish dressing machines comprising a bar having an angle-bar cross-section and a separate scraper blade secured to one flange of the angle-bar and having one edge projecting slightly at the apex of the angle.

12. A scraper for fish dressing machines comprising a bar having an angle-bar cross-section and a separate scraper blade secured to one flange of the angle-bar and having one edge projecting slightly at the apex of the angle, said edge being beveled on the face which is toward the angle bar to form a sharp scraping edge.

13. A scraper for fish dressing machines comprising a frame bar and a scraping blade and means for securing the scraping blade to the frame bar to form two substantially right-angle surfaces with the scraping edge of the blade at the angle between said surfaces.

14. A scraper for fish dressing machines comprising a frame bar and a scraping blade, means for securing said bar and blade together in right angular relation with the scraping edge of the blade projecting slightly beyond the apex of the angle, and means for applying the scraper with the outer face of the blade bearing against the surface of the fish.

15. A scraper for fish dressing machines comprising a frame bar and a scraping blade, means for securing said bar and blade together in right angular relation with the scraping edge of the blade projecting slightly beyond the apex of the angle, said bar and blade being curved to give the blade a concave outer face, and means for applying the scraper with the outer face of the blade bearing against the surface of the fish.

Signed at Seattle, King county, Washington this 24th day of February, 1920.

EDWARD H. WAUGH.